US008633895B2

(12) United States Patent
Choi et al.

(10) Patent No.: US 8,633,895 B2
(45) Date of Patent: Jan. 21, 2014

(54) APPARATUS AND METHOD FOR IMPROVING CHARACTER INPUT FUNCTION IN MOBILE TERMINAL

(75) Inventors: Yoon-Suk Choi, Gyeonggi-do (KR); Gi-Tae Mun, Gyeonggi-do (KR); Seung-Ho Park, Gyeonggi-do (KR); Jong-Min Lee, Incheon (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 135 days.

(21) Appl. No.: 13/409,680

(22) Filed: Mar. 1, 2012

(65) Prior Publication Data

US 2012/0242582 A1   Sep. 27, 2012

(30) Foreign Application Priority Data

Mar. 22, 2011  (KR) ........................ 10-2011-0025144

(51) Int. Cl.
  *G06F 3/02*  (2006.01)
  *G09G 5/00*  (2006.01)
(52) U.S. Cl.
  USPC .......................................... 345/168; 715/773

(58) Field of Classification Search
  USPC .................. 345/156, 168, 169; 715/764, 773
  See application file for complete search history.

(56) References Cited

U.S. PATENT DOCUMENTS

2010/0211904 A1  8/2010  Yun et al.

FOREIGN PATENT DOCUMENTS

| JP | 10-198669 A | 7/1998 |
| JP | 2001-356870 A | 12/2001 |

*Primary Examiner* — Ricardo L Osorio
(74) *Attorney, Agent, or Firm* — Cha & Reiter, LLC

(57) ABSTRACT

A character input mode of a mobile terminal permits easier viewing of characters being entered on a virtual keyboard. An apparatus and a method permitting detection of misprinted/omitted character when performing a special character input mode An output manager outputs a character input screen including a virtual keyboard region and a character input field region when entering a character input mode, and outputs an auxiliary character input field showing information of currently input data on the virtual keyboard region. A display unit outputs the auxiliary character input field, the character input field, and the virtual keyboard. When an input of the virtual keyboard is detected, the output manager outputs information of data corresponding to an input position on the character input field and the auxiliary character input field. The character input mode preferably includes a mode for inputting at least one of text data, symbol data, and emoticon data.

19 Claims, 6 Drawing Sheets

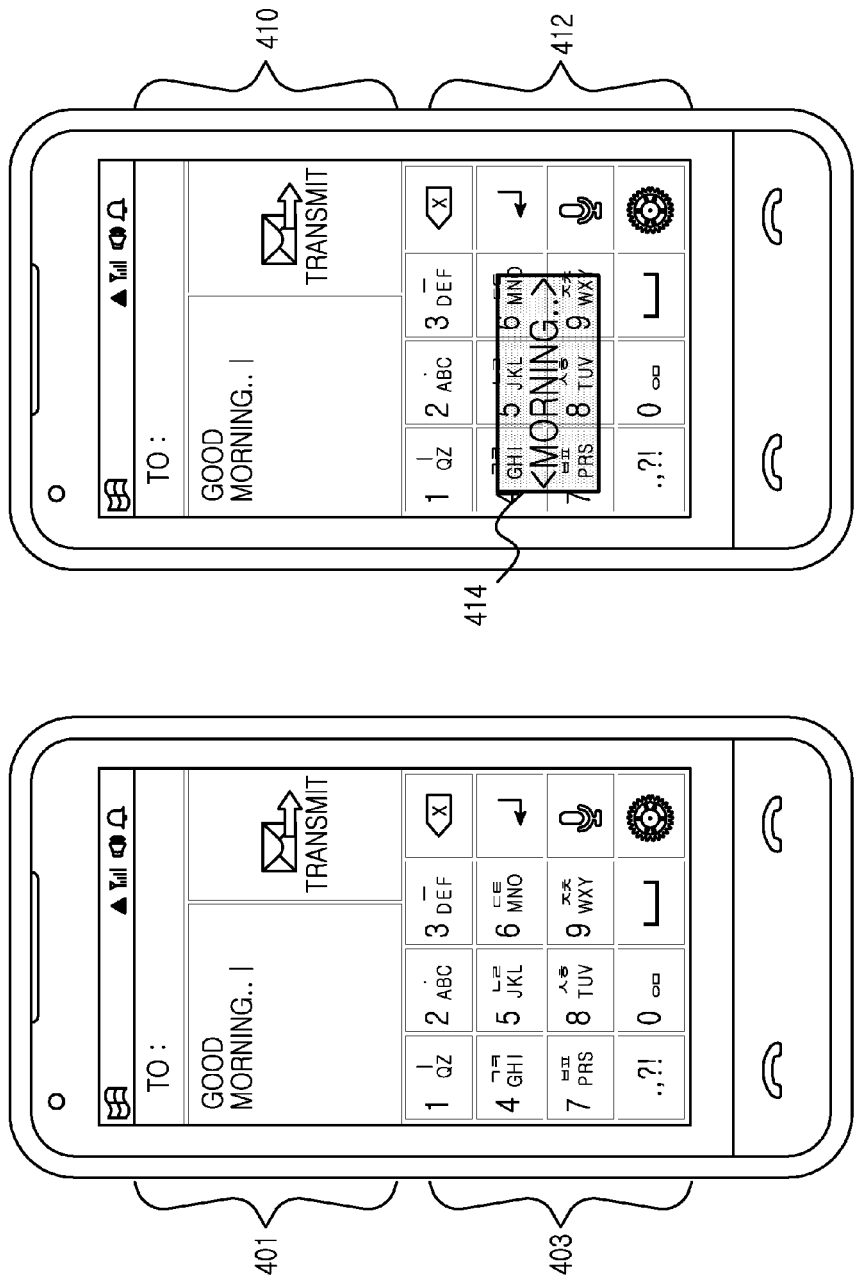

APPARATUS AND METHOD FOR IMPROVING CHARACTER INPUT FUNCTION IN MOBILE TERMINAL

CLAIM OF PRIORITY

This application claims the benefit under 35 U.S.C. §119(a) from a Korean patent application filed in the Korean Intellectual Property Office on Mar. 22, 2011 and assigned Serial No. 10-2011-0025144, the entire disclosure of which is hereby incorporated by reference in its entirety.

BACKGROUND OF THE INVENTION

1. Field of the Invention

The present invention relates to a character input mode of a mobile terminal.

2. Description of the Related Art

As the development of mobile terminal rapidly progresses, the need for a mobile terminal that permits both wireless voice communication and can also exchange information in other forms (such as text) has become a daily necessity. In the early stage of development, a mobile terminal was primarily used as a portable product that can enable wireless communication. As the technology develops and wireless Internet was introduced, the mobile terminal gradually expanded its utilization range to games, a remote controller using short distance communication, and image capturing using a mounted digital camera as well as the purposes of simple telephone communication or schedule management to meet a user's desire.

Of functions of the mobile terminal, a short message service (SMS) function has an advantage of a relatively inexpensive cost of operation when compared with voice communication, and SMS has become the communication method of choice by many wireless users.

In addition to utilizing a short message service, there has also been developed a multimedia message service, which is a message service including a moving image, a photo, a music file, etc. therein, is a representative wired/wireless integrated service that combines an advantage of the short message service and an advantage of an electronic mail service. Since the multimedia message service may add and provide multimedia contents, there has been increased frequency of use of the mobile terminal.

The multimedia message comprises a message service configuring text, music, an image, a moving image, link information, etc. in combination and transmitting the same. A user may transmit a wireless postcard or picture, a moving image, a moving image card map, a card, etc. via the multimedia message.

Recently, as a mobile terminals having a touch screen are being the most popular type of mobile terminal on the market with increased, a user may write a text message by touching a virtual keyboard output on the touch screen.

Since the mobile terminal discriminates and outputs the virtual keyboard and a character input field for outputting a character input via the virtual keyboard on the touch screen, a user determines whether characters of a text message that is currently being written are normally written without a misprint/omitted character while viewing the character input field.

In the case where a user of the mobile terminal writes a text message while viewing only the virtual keyboard because the user is not accustomed to a character input method, the user may write an incorrect character one or more times because the user is not aware of occurrence of the incorrect character.

Therefore, in order to solve the above problems, there is a need in the art for an apparatus and a method that can swiftly determine whether a misprint/omitted character occurs while inputting a character in a mobile terminal.

SUMMARY OF THE INVENTION

An exemplary aspect of the present invention is to provide an apparatus and a method for swiftly determining whether a misprint/omitted character occurs while inputting a character in a mobile terminal.

Another exemplary aspect of the present invention is to provide an apparatus and a method for outputting information of currently input data together on a virtual keyboard in order to improve a character input performance in a mobile terminal.

In accordance with an exemplary aspect of the present invention, an apparatus for improving a character input function in a mobile terminal preferably includes an output manager that outputs a character input screen including a virtual keyboard region and a character input field region when entering a character input mode, and outputs an auxiliary character input field that provides information of currently input data on the virtual keyboard region; and a display unit that displays the auxiliary character input field, the character input field, and the virtual keyboard; wherein when an input of the virtual keyboard is detected, the output manager outputs information of data corresponding to an input position on the character input field and the auxiliary character input field, and the character input mode preferably includes a mode that inputs at least one of text data, symbol data, and emoticon data. According to an exemplary embodiment of the present invention, the auxiliary character input field overlays a portion of the keys displayed by the virtual keyboard without preventing access to selecting any particular key of the virtual keyboard.

In accordance with another exemplary aspect of the present invention, a method for improving a character input function in a mobile terminal is provided. The method includes outputting a character input screen including a virtual keyboard region and a character input field region when entering a character input mode, outputting an auxiliary character input field that provides information of currently input data on the virtual keyboard region, and when detecting an input of the virtual keyboard, outputting information of data corresponding to an input position on the character input field and the auxiliary character input field, wherein the character input mode preferably includes a mode for inputting at least one of text data, symbol data, and emoticon data.

In accordance with still another exemplary aspect of the present invention, an apparatus for inputting a character in a mobile terminal preferably includes an output manager that outputs an auxiliary character input field that provides information of currently input data in a virtual keyboard region and outputting a user's input data on the auxiliary character input field when entering a character input mode, a display unit that displays the auxiliary character input field, a character input field, and the virtual keyboard, and a controller that detects a touch input on the virtual keyboard to analyze the user's input data and controls to output the analyzed input data, wherein the output manager moves a cursor representing a data input position depending on the user's input.

Other exemplary aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary aspects, features and advantages of certain exemplary embodiments of the present invention will become more apparent to a person of ordinary skill in the art from the following description taken in conjunction with the accompanying drawings in which:

FIG. 4A is a view illustrating a character input mode of the conventional mobile terminal;

FIG. 4B is a view illustrating a character input mode of a mobile terminal according to an exemplary embodiment of the present invention;

Throughout the drawings, like reference numerals will be understood to refer to like parts, components and structures.

DETAILED DESCRIPTION

The following description is provided with reference to the accompanying drawings to assist a person of ordinary skill in the art with a comprehensive understanding of exemplary embodiments of the invention as defined by the appended claims. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. Also, descriptions of well-known functions and constructions may be omitted for clarity and conciseness when their inclusion could obscure appreciation of the present invention by the person of ordinary skill in the art.

The present invention provides an apparatus and a method for outputting information of currently input data together on a virtual keyboard in order to easily detect generation of a misprint/omitted character when performing a special character input mode.

Exemplary embodiments of the present invention provide an apparatus and a method that swiftly determine whether a misprint/omitted character occurs while inputting a character by outputting information of currently input data together on a virtual keyboard in a mobile terminal.

Figure 1:
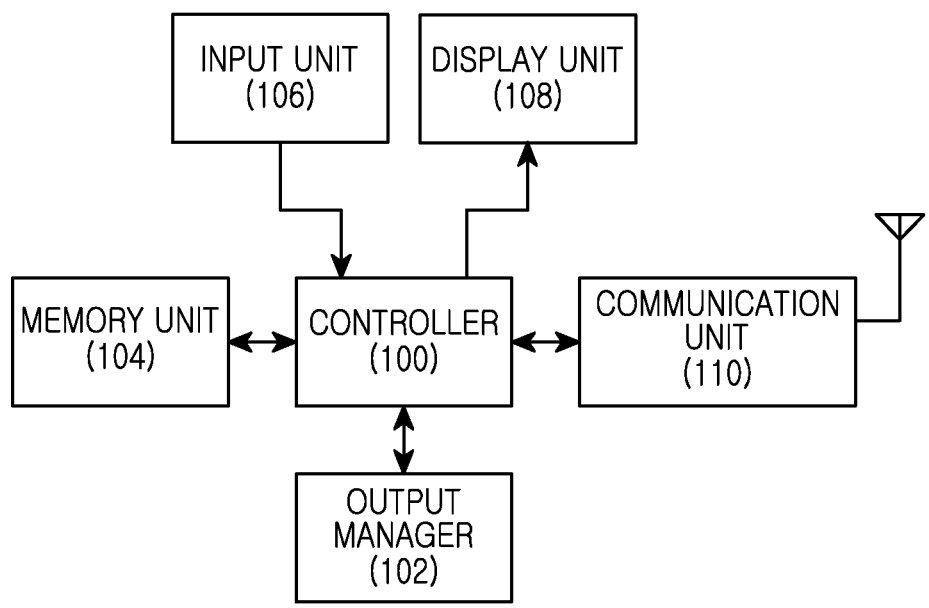
FIG. 1 is a block diagram illustrating a mobile terminal that supports an input mode according to an exemplary embodiment of the present invention.

FIG. 1 is a block diagram illustrating a mobile terminal that supports an input mode according to an exemplary embodiment of the present invention.

Referring now to FIG. 1, the mobile terminal includes a controller 100, an output manager 102, a memory unit 104, an input unit 106, a display unit 108, and a communication unit 110. The artisan should appreciate that the mobile terminal may include additional units that are not illustrated here for sake of clarity. Similarly, the functionality of two or more of the above units may be integrated into a single component.

First, the controller 100 of the mobile terminal controls an overall operation of the mobile terminal. For example, the controller 100, which preferably comprises a processor or microprocessor, performs processes and controls for voice communication and data communication. In addition to the general functions being controlled, according to an exemplary embodiment of the present invention, when performing a character input mode, the controller 100 divides an output region of the display unit 108 into a first region on which a character input field is to be output and a second region on which a virtual keyboard is to be output, and controls to output an auxiliary character input field together on the second region. Here, the auxiliary character input field denotes a field for outputting information of data input by a user.

The output manager 102, which may also include a microprocessor, divides the output region of the display unit 108 into the first region and the second region under control of the controller 100, and determines a position corresponding to the user's touch input and a position of the virtual keyboard to determine data input by the user. At this point, the output manager 102 processes to provide an output of the character input field on the first region, and output of the virtual keyboard and the auxiliary character input field on the second region. Subsequently, the output manager 102 processes to output the determined data on the character input field of the first region and the auxiliary input field.

In addition, the output manager 102 may provide an output of the auxiliary character input field on the virtual keyboard in a translucent type. In other words, there can be a translucent-type display of the auxiliary character input field over a portion of the virtual keyboard.

The memory unit 104 of the mobile terminal comprises a non-transitory machine readable medium and preferably includes, for example, Read Only Memory (ROM), Random Access Memory (RAM), and a flash ROM. The ROM stores microcodes of programs for processes and controls of the controller 100 and the output manager 102, and various reference data. The artisan appreciates and understands the claimed invention is not limited to the aforementioned types of memory.

The RAM preferably serves as a working memory of the controller 100 and stores temporary data that occur during execution of various programs. In addition, the flash ROM stores various updatable data for storage such as a phonebook, calling messages, received messages, and information of a user's touch input point. Furthermore, the memory unit 104 stores information for inputting the auxiliary character input field according to an exemplary embodiment of the present invention.

The input unit 106 includes a plurality of function keys such as, for example, numerical key buttons of 0 to 9, a menu button, a cancel button, an OK button, a TALK button, an END button, an Internet access button, navigation key (directional key) buttons, character input keys, etc., and provides key input data corresponding to a key pressed by a user to the controller 100. Other types of keys or the use of different labeling of the keys other than described hereinabove is within the spirit and scope of the claimed invention. In addition, while the term "button" is used in reference to keys, the artisan appreciates a virtual keyboard on a touchscreen having various alpha-numeric characters, symbols and function keys are within the definition of the key button as used herein.

An artisan also appreciates that the input may optionally include a transducer for voice input.

The display unit 108 displays status information generated during an operation of the mobile terminal, a limited number of characters, a large amount of moving images and still images, etc. According to an exemplary embodiment of the present invention, the display unit 108 divides the output region into the first region for outputting the character input field and the second region for outputting the virtual keyboard. In addition, the second region of the display unit 108 outputs the auxiliary character input field for outputting information of currently input data together with the virtual keyboard. The display unit 108 may comprise a Liquid Crystal Display (LCD), an Active-Matrix Organic Light-Emitting Diode (AMOLED), and/or virtually any of the other types of thin-film technology screen display apparatuses. The display unit 108 may preferably include a touch input device, and when it is applied to a touch input type mobile terminal, the display can be used as an input unit or alternative/supplemental input unit.

With continued reference to FIG. 1, the communication unit 110 transmits/receives a Radio Frequency (RF) signal of data input/output via an antenna (not illustrated). For example, during transmission, the communication unit 110 channel-codes and spreads data to be transmitted, and then performs an RF process on the signal to transmit the signal. During reception, the communication unit 110 converts a received RF signal into a baseband signal, and despreads and channel-decodes the baseband signal to recover data. The artisan understands and appreciates that the communication unit of the present invention is not limited to spread spectrum technology and virtually any other known transmission protocol for portable communication devices can be used.

The functions of the output manager 102 may be performed by the controller 100 of the mobile terminal. The separate physical configuration and illustration of the output manager 102 can be considered a logical separation for exemplary purposes only for ease of description, not for limiting the claimed scope of the present invention. Those skilled in the art should appreciate that various modifications may be made within the scope of the present invention. For example, all functions of the output manager 102 may be processed by the controller 100.

Figure 2:
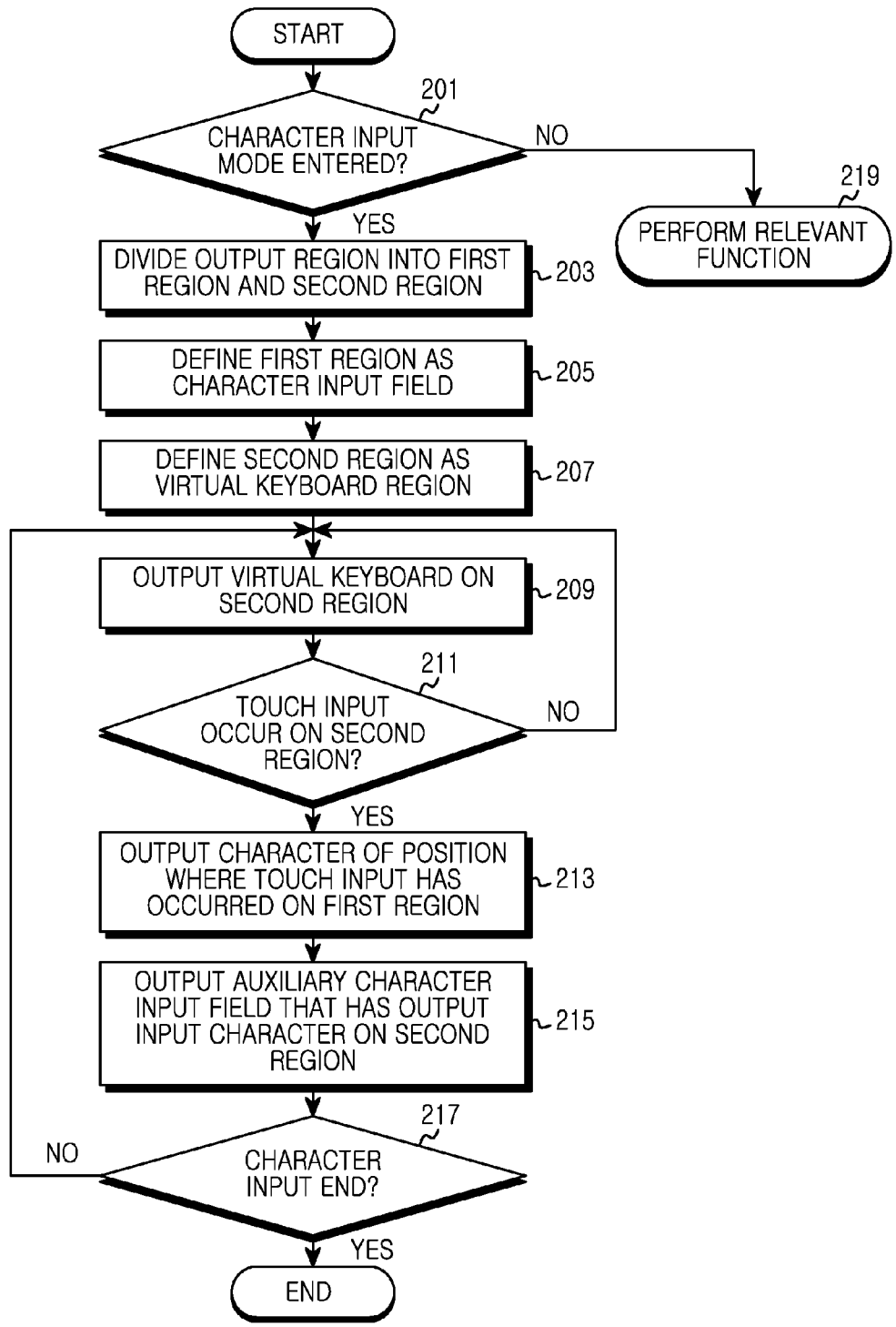
FIG. 2 is a flowchart illustrating a character input procedure of a mobile terminal according to an exemplary embodiment of the present invention.

FIG. 2 is a flowchart illustrating a character input procedure of a mobile terminal according to an exemplary embodiment of the present invention.

Referring now to FIG. 2, at step 201 the controller of the mobile terminal determines whether a character input mode has been entered. Here, the character input mode denotes a mode that allows the user to input text data such as a text message, a memo, and schedule setting, symbol data, emoticon data, etc.

At step 203 the mobile terminal divides an output region of the display unit into the first region and the second region, and then performs step 205 to define the first region as a character input field.

The mobile terminal then performs step 207 to define the second region as the virtual keyboard region. For example, the mobile terminal may set a half of the output region to the first region and the rest of the output region to the second region. At this point, the directions and the sizes of the first region and the second region may be allocated depending on the user's selection or values set during a manufacturing process. In addition, the character input field defined in the first region denotes a field on which data of the virtual keyboard input via the user's touch is input and which outputs the user's data input state. The virtual keyboard denotes a virtual input unit including a plurality of characters, numbers, symbols, etc. The virtual keyboard includes a QWERTY keyboard scheme, a chun-ji-in scheme, a Moa key scheme, a DVORAK keyboard scheme, etc.

With continued reference to FIG. 2, the mobile terminal next performs step 209 to output the virtual keyboard on the second region to prepare data input by a user.

The mobile terminal then performs step 211 to determine whether or not a touch input by the user has been detected on the second region. Here, step 211 denotes a sub-process for determining whether a touch input occurs on a character, a number, a symbol, etc. of the virtual keyboard output on the second region.

When determining that the touch input does not occur on the second region in step 211, the mobile terminal re-performs step 209.

When determining at step 211 that the touch input occurs on the second region, the mobile terminal then performs step 213 to output data of the virtual keyboard where the touch input has occurred on the first region, and then performs step 215 to output the auxiliary character input field on the second region, and outputs data of the virtual keyboard where the touch input has occurred on the auxiliary character input field. Here, the auxiliary character input field comprises a field for outputting data output on the first region or a predetermined number of data output on the first region to allow a user of the mobile terminal to determine whether or not the user has correctly input the data of the virtual keyboard. In other words, whereas in the conventional mobile terminal, the virtual keyboard and the character input field are separated, so that a user determines whether data input has been correctly performed by viewing a character output on the character input field while inputting the data, there is not the same separation in the present invention. In contrast, according to an exemplary embodiment of the present invention, input data is output on the virtual keyboard, so that a user can perform a data input procedure fast and conveniently without viewing the character input field.

The mobile terminal then performs step 217 to determine whether or not a character input by the user has ended.

When determining at step 217 that the character input has not ended, the mobile terminal re-performs step 209.

In contrast, when at step 217 the controller determines that the character input has ended, the mobile terminal ends the present process.

Figure 3:
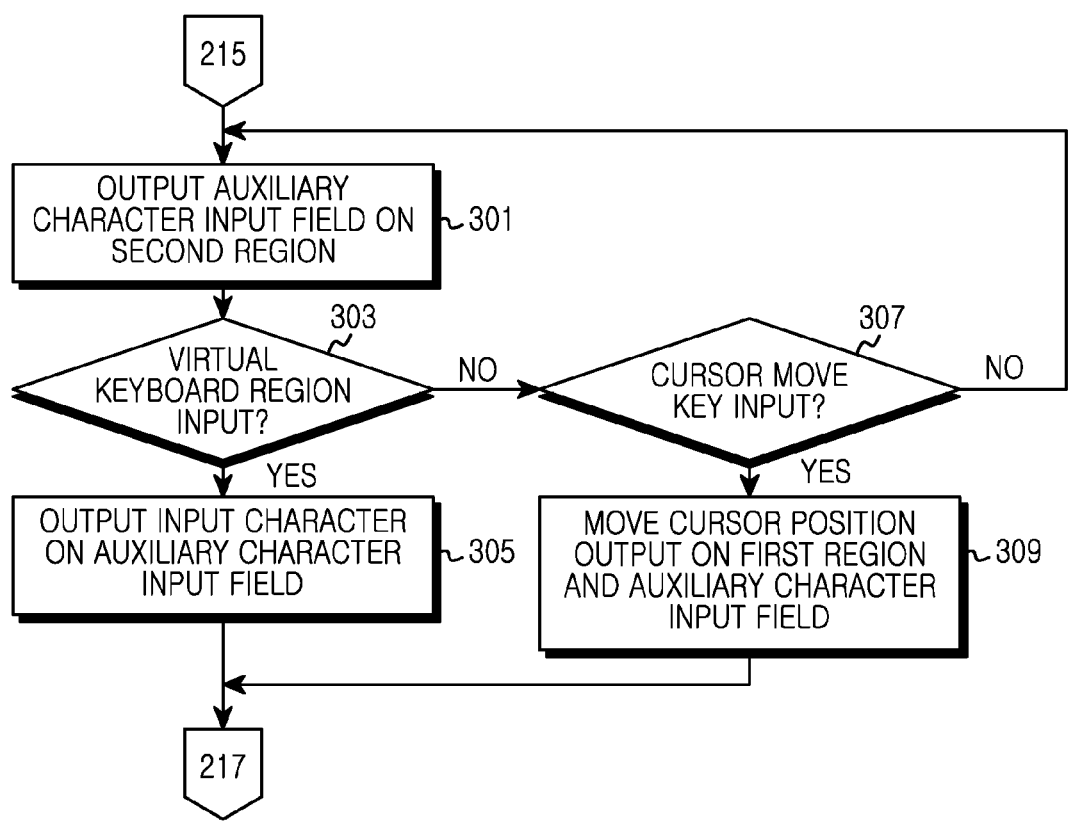
FIG. 3 is a flowchart illustrating a virtual keyboard input procedure of a mobile terminal according to an exemplary embodiment of the present invention.

FIG. 3 is a flowchart illustrating a virtual keyboard input procedure of a mobile terminal according to an exemplary embodiment of the present invention with particular explanation of step 215 in FIG. 2.

Referring now to FIG. 3, at 301 the mobile terminal outputs the auxiliary character input field on the second region where the virtual keyboard has been output in step, and then performs step 303 to determine whether or not an input of a user who has input on the virtual keyboard is detected. Here, the virtual keyboard region is a plurality of input buttons forming the virtual keyboard, and denotes a region corresponding to a character input button, a number input button, and a symbol input button.

When detecting at step 303 the input of the user who has input on the virtual keyboard, the mobile terminal then performs step 305 to output data of the virtual keyboard input by the user to the auxiliary character input field. Of course, the mobile terminal outputs the data input by the user to the first region.

In contrast, when at step 303 it is detected that there has not been an input on the virtual keyboard, the mobile terminal performs step 307 to determine whether or not an input of a cursor move key is detected. Here, the cursor move key denotes a key for moving a cursor representing a data input position of the character input field corresponding to the first region to up/down and left/right directions. Data of a specific position may be deleted from output data or new data may be added to a specific position via the cursor move key.

When at step 307 not detecting the input of the cursor move key, the mobile terminal re-performs step 301.

In contrast, when at step 307 the controller detects the input of the cursor move key, the mobile terminal proceeds to step 309 to move the position of a cursor output on the first region and the auxiliary character input field.

Subsequently, the mobile terminal then performs step 217 of FIG. 2 to determine whether a character input ends.

FIG. 4 is a view comparing a character input mode of the conventional mobile terminal with that of an exemplary embodiment of the present invention.

FIG. 4A is a view illustrating a character input mode of the conventional mobile terminal.

Referring now to FIG. 4A, the mobile terminal supports a character input mode where a character input field 401 and a virtual keyboard 403 are separated.

The virtual keyboard 403 may be configured using characters, numbers, symbol data, etc. Data of the virtual keyboard 403 input by the user is input to the character input field 401 and output. That is, when the user of the mobile terminal touches the virtual keyboard 403 to input character data of "GOOD MORNING", the input character data of "GOOD MORNING" is output to the character input field 401.

Accordingly, when inputting a character, the user of the mobile terminal views data output to the character input field 401 and the virtual keyboard 403 to perform a character input process. However, since a distance of a predetermined interval exists between the virtual keyboard 403 and the character input field 401, the user cannot simultaneously view the virtual keyboard 403 and the character input field 401, since the user is typically looking at the keyboard in an attempt to press the correct key. Accordingly, when a misprint/omitted character occurs while the user views only the virtual keyboard 403 to perform the character input process, the user continues to perform the character input process without recognizing occurrence of the misprint/omitted character until the user views the character input field 401.

FIG. 4B is a view illustrating a character input mode of a mobile terminal according to an exemplary embodiment of the present invention.

Referring now to FIG. 4B, the mobile terminal supports a character input mode where a character input field 410 and a virtual keyboard 412 are separated. This is the same as the character input mode of the conventional mobile terminal. However, a mobile terminal according to an exemplary embodiment of the present invention outputs an auxiliary character input field 414 onto the virtual keyboard 412 when performing the character input mode.

More particularly, the mobile terminal outputs data of the virtual keyboard 412 input by a user to the auxiliary character input field 414 to allow the user to simultaneously view the virtual keyboard 412 and the input data. Therefore, the user of the mobile terminal may view the auxiliary character input field 414 to easily determine whether a misprint/omitted character occurs without viewing the character input field 410.

FIG. 5 is a view illustrating a construction of an auxiliary character input field of a mobile terminal according to an exemplary embodiment of the present invention.

Figures 5A, 5B:
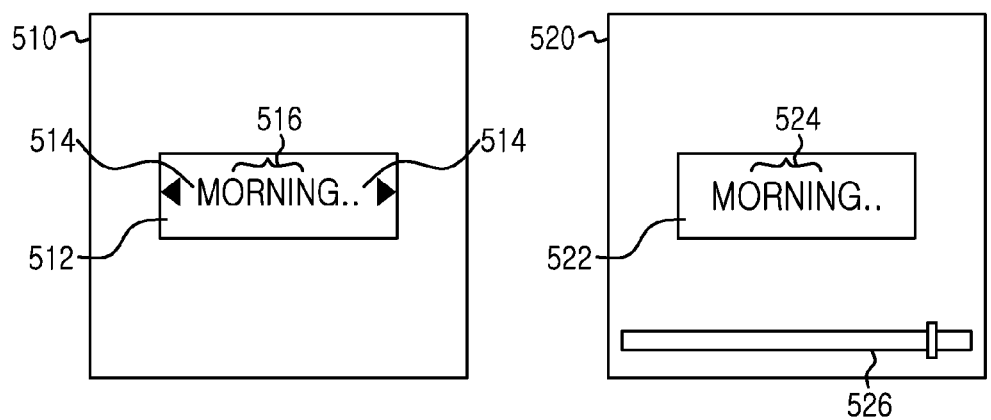
FIG. 5A is a view illustrating a construction of an auxiliary character input field according to an exemplary embodiment of the present invention.
FIG. 5B is a view illustrating a construction of an auxiliary character input field according to an exemplary embodiment of the present invention.

FIG. 5A is a view illustrating a construction of an auxiliary character input field according to an exemplary embodiment of the present invention.

Referring now to FIG. 5A, as described above, the auxiliary character input field 512 is output together on a region 510 where the virtual keyboard is output to output data 516 of the virtual keyboard input by the user. In addition, the auxiliary character input field 512 may include a cursor move key 514 for moving a cursor indicating a position where input data is output. Accordingly, a user of the mobile terminal may change the position of a cursor output in advance using the cursor move key.

FIG. 5B is a view illustrating a construction of an auxiliary character input field according to an exemplary embodiment of the present invention.

Referring now to FIG. 5B, as described above, the auxiliary character input field 522 is output together on a region 520 where the virtual keyboard is output to output data 524 of the virtual keyboard input by the user. Like the auxiliary character input field 512 illustrated in FIG. 5A, a cursor move key may be incorporated into the auxiliary character input field, but according to an exemplary embodiment of the present invention, the cursor move key 526 may be formed separately from the auxiliary character input field 522. That is, the cursor move key 526 may be output in the form of a scroll bar on a region that does not overlap the auxiliary character input field 522 and the virtual keyboard. This is for solving a problem that the cursor move key of the auxiliary character input field configured as in FIG. 5A overlaps the virtual keyboard and so it is difficult to determine whether a user's touch input is an input of the virtual keyboard or an input of the cursor move key.

Figure 6:
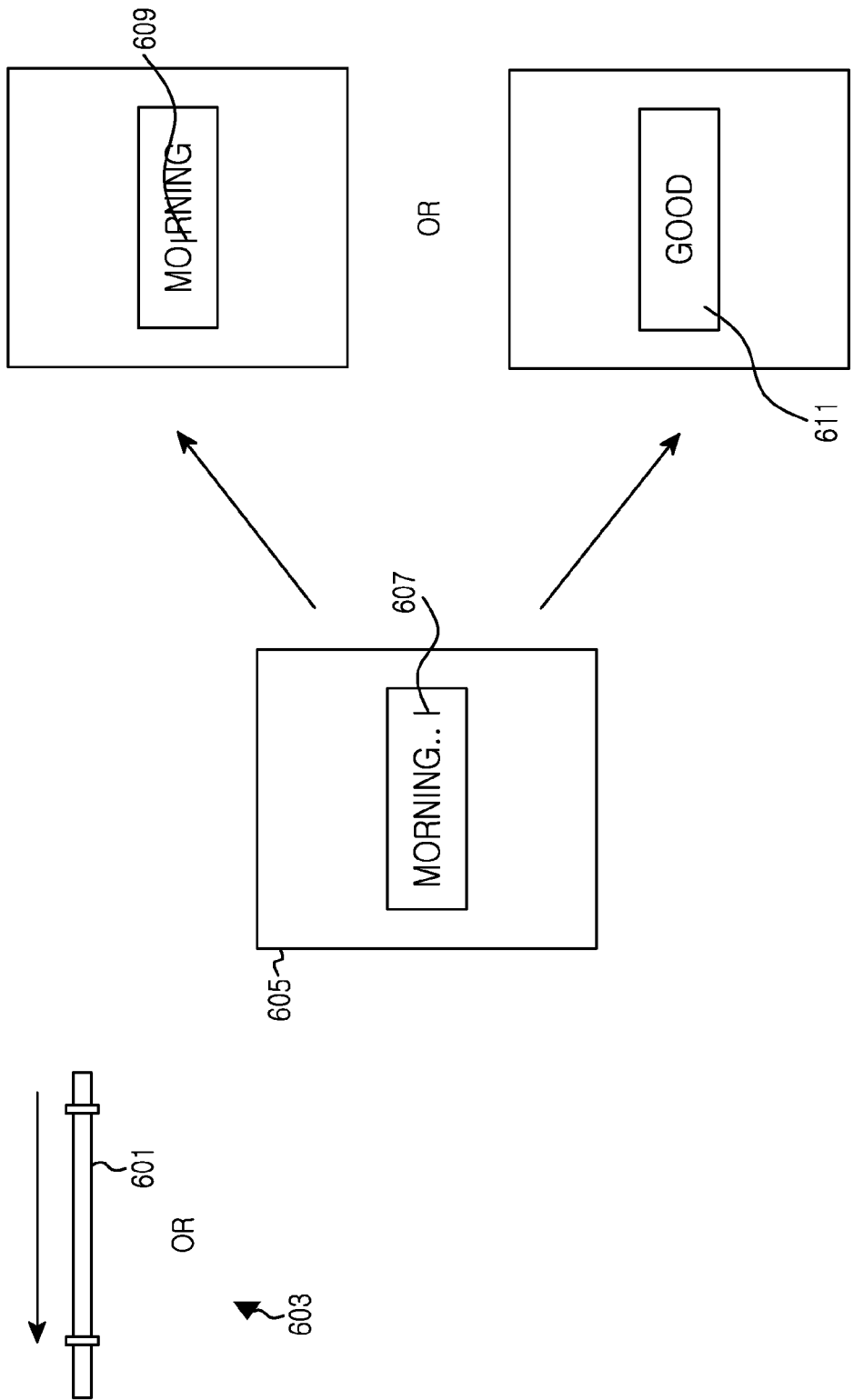
FIG. 6 is a view illustrating a cursor move procedure of an auxiliary character input field according to an exemplary embodiment of the present invention.

FIG. 6 is a view illustrating a cursor move procedure of an auxiliary character input field according to an exemplary embodiment of the present invention.

Referring now to FIG. 6, the auxiliary character input field is output on a region of a virtual keyboard, and a cursor move key is output together in a region where the virtual keyboard and the auxiliary character input field are output. The cursor move key is for moving a cursor indicating an output position of data output via the virtual keyboard, and may be realized in the form of a scroll bar 601 or an arrow 603 as illustrated.

When the cursor move key moves to the left, the mobile terminal moves (609) the position of a cursor 607 that is being output on the auxiliary character input field or the character input field on the virtual keyboard to the left, or moves data that is being output on the character input field by a predetermined interval to output (611) the data on the auxiliary character input field. That is, when detecting an input of a left cursor move key with data of "GOOD MORNING" output on the character input field, the mobile terminal may move the cursor positioned after a period (.) between "O" and "R", or may output data of "GOOD" instead of data of "MORNING".

As described above, the present invention provides a method for swiftly detecting whether a misprint/omitted character occurs when inputting a character in a mobile terminal. The method outputs information of currently input data on a virtual keyboard together, so that a user may input a character and simultaneously detect accuracy of the input character.

The above-described methods according to the present invention can be implemented in hardware or as software or computer code that can be stored in a recording medium such as a CD ROM, an RAM, a floppy disk, a hard disk, or a magneto-optical disk or downloaded over a network and stored on a non-transitory machine readable medium, so that the methods described herein can be rendered in such software using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the presently claimed invention should not be limited to the above-described embodiments.

What is claimed is:

1. An apparatus for improving a character input function in a mobile terminal, the apparatus comprising:
    a display unit for displaying an auxiliary character input field, a character input field, and a virtual keyboard;
    a controller for controlling overall operation of the mobile terminal; and
    an output manager that under control of the controller generates a character input screen comprising a virtual keyboard region and a character input field region when entering a character input mode, and generates an auxiliary character input field that provides information of currently input data that is displayed on the virtual keyboard region,
    wherein when an input of the virtual keyboard is detected, the output manager outputs information of data corresponding to an input on the character input field and the auxiliary character input field, and the character input mode comprises a mode for inputting at least one of text data, symbol data, and emoticon data.

2. The apparatus of claim 1, wherein the auxiliary character input field overlays a portion of the keys displayed by the virtual keyboard without preventing access to selecting any particular key of the virtual keyboard.

3. The apparatus of claim 1, wherein the virtual keyboard comprises at least one of a QWERTY keyboard scheme, a chun-ji-in scheme, a DVORAK scheme and a Moa key scheme.

4. The apparatus of claim 1, wherein the output manager generates a translucent display of the auxiliary character input field over a portion of the virtual keyboard region.

5. The apparatus of claim 1, wherein the output manager generates an auxiliary character input field comprising a cursor move key for moving a cursor representing a corresponding data input position of the character input field.

6. The apparatus of claim 1, wherein the output manager generates an output of the auxiliary character input field, and outputs a cursor move key to a region of the display that does not overlap the auxiliary character input field and the virtual keyboard.

7. The apparatus of claim 1, wherein the output manager generates an output of at least one of a cursor move key of an arrow type and a cursor move key of a scroll type.

8. The apparatus of claim 1, wherein the display unit comprises one of a Liquid Crystal Display (LCD) and an Active-Matrix Organic Light-Emitting Diode (AMOLED).

9. The apparatus of claim 1, wherein the controller divides an output region of the display unit into a first region on which the character input field is displayed and a second region on which a virtual keyboard is displayed, and controls output of an auxiliary character input field together with the virtual keyboard on the second region.

10. A method for improving a character input function in a mobile terminal, the method comprising:
    outputting a display of a character input screen comprising a virtual keyboard region and a character input field region when entering a character input mode;
    outputting a display of an auxiliary character input field that is generated by an output manager that outputs information of currently input data on the virtual keyboard region; and
    when a controller detecting an input of the virtual keyboard, outputting information of data corresponding to an input of both the character input field and the auxiliary character input field,
    wherein the character input mode comprises a mode for inputting at least one of text data, symbol data, and emoticon data.

11. The method of claim 10, wherein the virtual keyboard comprises at least one of a QWERTY keyboard scheme, a chun-ji-in scheme, a DVORAK scheme and a Moa key scheme.

12. The method of claim 10, wherein the outputting a display of the auxiliary character input field that provides the information of currently input data on the virtual keyboard region comprises the output manager generating an outputting of a translucent display of the auxiliary character input field to overlay a portion of the virtual keyboard.

13. The method of claim 10, wherein the outputting a display of the auxiliary character input field that provides the information of currently input data on the virtual keyboard region comprises outputting a display of an auxiliary character input field comprising a cursor move key that moves a cursor representing a data input position of the character input field.

14. The method of claim 10, wherein the outputting a display of the auxiliary character input field that provides the information of currently input data on the virtual keyboard region comprises, after outputting a display of the auxiliary character input field, outputting a display of a cursor move key to a region that does not overlap the auxiliary character input field and the virtual keyboard.

15. The method of claim 10, wherein the outputting a display of the auxiliary character input field that outputs the information of currently input data on the virtual keyboard region comprises outputting a display of one of a cursor move key of an arrow type and a cursor move key of a scroll type.

16. An apparatus for inputting a character in a mobile terminal, the apparatus comprising:
    an output manager that outputs display of a generated auxiliary character input field that provides information of currently input data in a virtual keyboard region and outputting a display of a user's input data on the auxiliary character input field when entering a character input mode;
    a display unit that displays the auxiliary character input field, a character input field, and the virtual keyboard; and
    a controller that detects a touch input on the virtual keyboard to analyze the user's input data and control output of the analyzed input data,
    wherein the output manager moves display of a cursor representing a data input position in correspondence with the user's input data.

17. The apparatus of claim 16, wherein the virtual keyboard comprises at least one of a QWERTY keyboard scheme, a chun-ji-in scheme, a DVORAK scheme and a Moa key scheme.

18. The apparatus of claim 16, wherein the display unit comprises one of a Liquid Crystal Display (LCD) and an Active-Matrix Organic Light-Emitting Diode (AMOLED).

19. The apparatus of claim 16, wherein the controller divides an output region of the display unit into a first region on which the character input field is displayed and a second region on which a virtual keyboard is displayed, and controls output of an auxiliary character input field together with the virtual keyboard on the second region.

\* \* \* \* \*